March 31, 1970 K. W. OPPERMAN 3,503,674
SCATTERPLATE WITH ANTIREFLECTION COATINGS
Filed Feb. 5, 1968 2 Sheets-Sheet 2

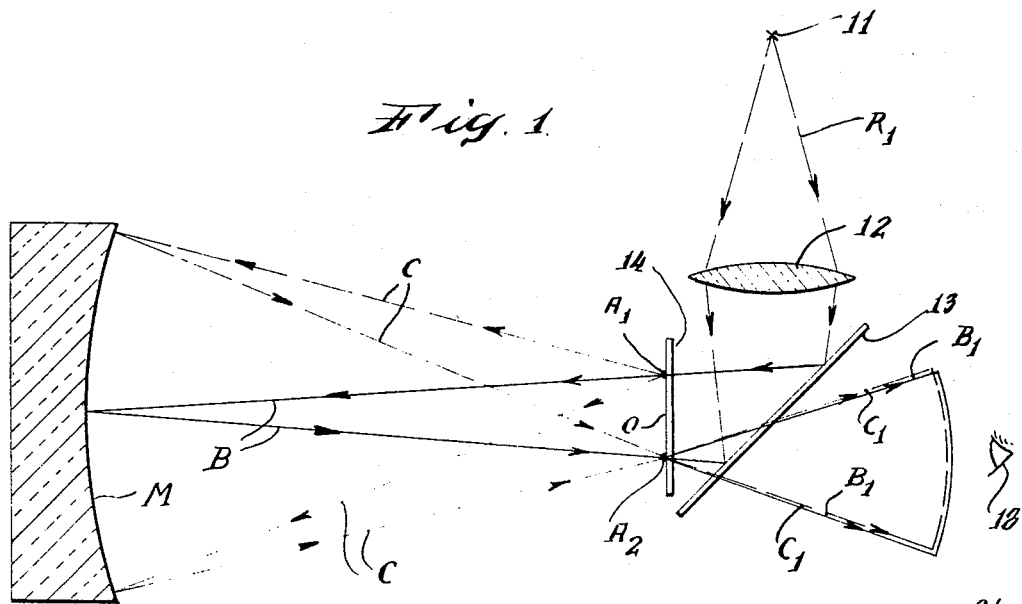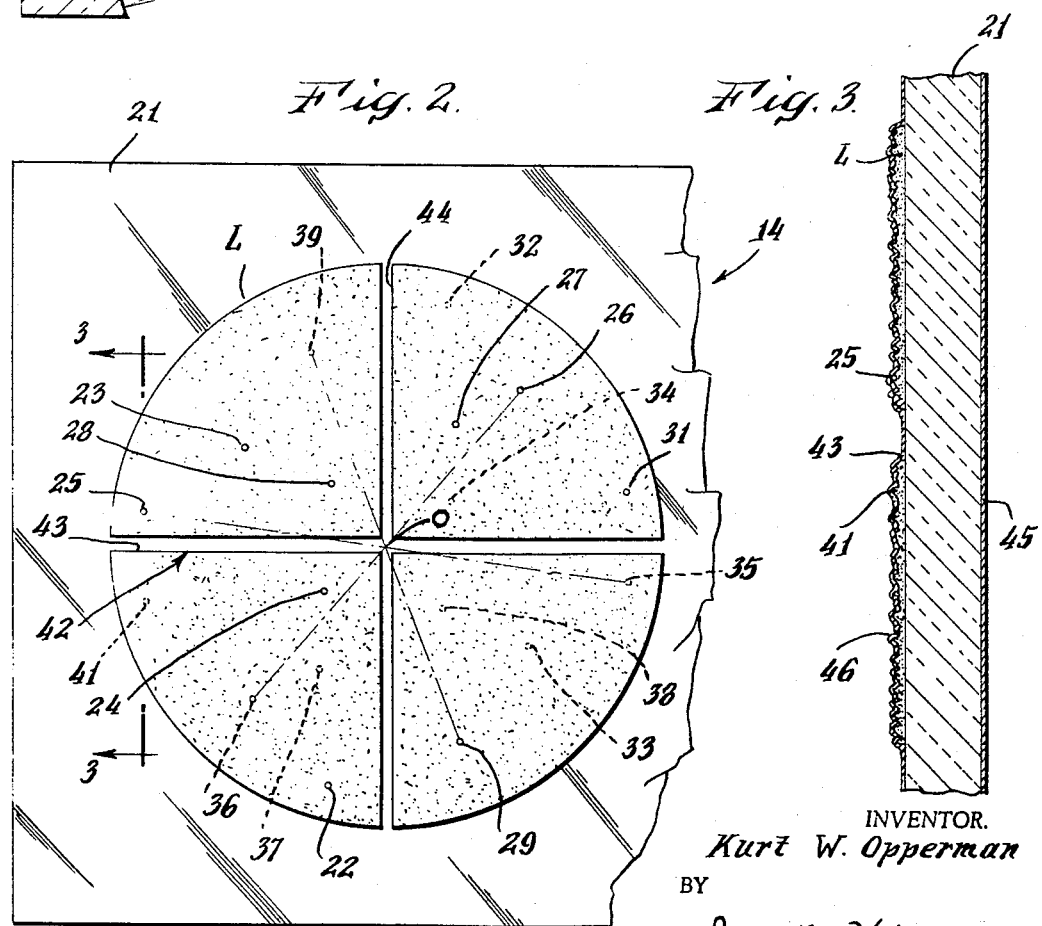

INVENTOR.
Kurt W. Opperman
BY
Irving M. Kriegsman
ATTORNEY.

United States Patent Office 3,503,674
Patented Mar. 31, 1970

3,503,674
SCATTERPLATE WITH ANTIREFLECTION COATINGS
Kurt W. Opperman, Stamford, Conn., assignor to The Perkin-Elmer Corporation, Norwalk, Conn., a corporation of New York
Filed Feb. 5, 1968, Ser. No. 703,098
Int. Cl. G02b 1/10
U.S. Cl. 350—164
8 Claims

ABSTRACT OF THE DISCLOSURE

A method and apparatus for making a scatterplate for use in a scatter fringe interferometer and the scatterplate so produced. The scatterplate contains two identical, symmetrically disposed sets of scatter points, a fiduciary mark at the center of symmetry and is antireflection coated on both sides. The scatterplate is made by doubly exposing a photographic plate to light generated by a laser after it is passed through a diffuser screen. The plate is rotated 180° in its plane between exposures. A pair of crossed wires placed in front of the plate and intersecting along the axis of rotation of the plate create an unexposed area on the plate at the center of symmetry. The plate is antireflection coated after it is developed, washed and bleached.

This invention relates to light scattering devices. More particularly, this invention relates to the construction of a new and improved scatterplate for use in a scatterplate interferometer.

A scatterplate interferometer is a relatively new, but nevertheless now well known, form of common path interferometer in which an interference fringe pattern is produced by superimposing two beams or bundles of scattered light derived from a common source. It is sometimes referred to as a scatter fringe interferometer or a Burch interferometer. Some of the published materials on the technique of scatterplate interferometry are as follows:

(1) A book entitled Concepts of Classical Optics, J. Strong, 1958, W. H. Freeman & Co., Appendix B;
(2) An article entitled "Interference of Scattered Light," American Journal of Physics, volume 35, No. 4, 1967, pp. 301–313; and
(3) An article entitled "Scatter Fringes of Equal Thickness," Nature, volume 171, May 16, 1963, pp. 889–890.

The scatterplate interferometer is an extremely useful instrument for testing spehrical mirrors, aspherical mirrors and various types of lens systems.

The principal component of a scatterplate interferometer is the light scattering device called the scatterplate. The scatterplate is essentially a translucent plate that transmits light specularly and by scattering. The scattering is caused by the interaction of the incoming light with a plurality of light scattering points or particles located on the scatterplate. The angle through which the light is scattered must be sufficiently large to match the $f$ number of the element or system being tested. The scatter angle is inversely proportional to the size of the scatter points.

The first developed scatterplate interferometer contained two scatterplates which were positioned relative to each other and the test piece so that each scatter point on one of the scatterplates would be imaged, after striking the test piece, onto a corresponding scatter point on the other scatterplate. An example of this type of interferometer may be found on page 383 in the above cited book by J. Strong. More recently, however, scatterplate interferometers have been constructed using only one scatterplate having two identical sets of scatter points symmetrically disposed about a centerpoint. The present invention is primarily concerned with this latter type of scatterplate.

Hitherto, two different techniques have been used in making scatterplates of the type having two sets of scatter points on a single plate. According to one technique, a slab of ground glass is impressed against a sheet of hot plastic two times so as to form on the plastic two sets of scatter points. Between impressions, the plastic is rotated precisely 180° in its plane. According to the other technique a photographic plate is exposed twice to light transmitted through a slab of ground glass from a mercury arc lamp. The slab of ground glass is positioned so that it is essentially in contact with the photographic plate during exposures and is rotated 180° between exposures. After the two exposures, the plate is developed, washed and bleached. Although scatterplates fabricated by these techniques have performed in a generally satisfactory manner their ultimate usefulness has been limited by: (1) a lack of a sufficiently large scatter angle; (2) a lack of good fringe contrast; (3) a lack of a conveniently located fiduciary mark for indicating the center of symmetry of the scatter points; and (4) a lack of reproducibility.

Accordingly, it is an object of this invention to provide a new and improved scatterplate.

It is another object of this invention to provide a new and improved technique for fabricating scatterplates.

It is still another object of this invention to provide a scatterplate that will produce a scatter angle or scatter cone as large as 60° so as to fill an $f/1$ optical system.

It is yet still another object of this invention to provide a scatterplate having a conveniently located fiduciary mark to enable easy alignment.

It is another object of this invention to provide a scatterplate that has good fringe contrast.

It is still another object of this invention to provide a scatterplate that can be used to test surfaces that are not highly reflective.

It is yet still another object of this invention to provide a technique for fabricating scatterplates having good reproducibility.

The above and other objects are achieved by constructing a scatterplate according to this invention.

Briefly, the scatterplate is made from a high resolution photographic plate. The two sets of scatter points are generated on the plate by a double exposure process, in which the plate is rotated 180° between exposures. The exposure process includes positioning the plate a discrete distance from a glass diffuser screen which is illuminated with a beam of monochromatic coherent light from a laser. The exposure times are controlled. Means are provided for compensating for the Gaussian energy distribution of the light from the laser. Means are also provided for generating on the plate a fiduciary mark which is located exactly at the center of symmetry of the two sets of scatter points. Both sides of the scatterplate are coated with a high efficiency antireflection coating which is deposited after the plate is developed, washed and bleached.

Other features and advantages of the invention will become apparent on reading the following detailed description when taken in conjunction with the drawings in which like reference numerals represent like parts and wherein:

FIGURE 1 is a schematic view of a scatterplatae interferometer, including a scatterplate constructed according to this invention;

FIGURE 2 is a front view of a scatterplate constructed according to this invention, the size of some of the scatter points being greatly enlarged for illustrative purposes;

FIGURE 3 is an enlarged view in section of a portion of the scatterplate shown in FIGURE 2 taken along lines 3—3;

Figure 4:
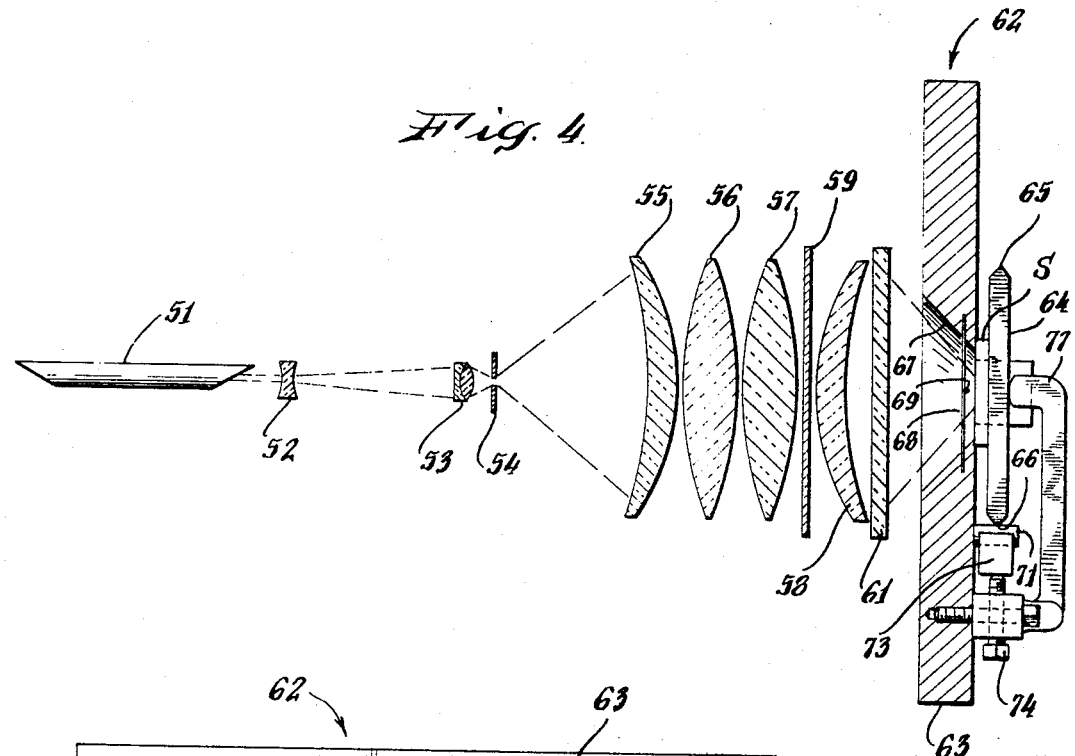
FIGURE 4 is a schematic view partly in section of an apparatus for use in making a scatterplate according to this invention.

Referring now to FIGURE 1, there is shown an example of a scatterplate interferometer, including a scatterplate constructed according to this invention. The interferometer is arranged for testing a concave spherical mirror M. The interferometer includes a point source of light 11, a focusing lens 12, a 45° beamsplitting mirror 13 and a scatterplate 14. The mirror M is positioned in the focal plane of the focusing lens 12. The scatterplate 14 is positioned at the center of curvature of mirror M. The scatterplate 14 contains two sets of scatter points. Each scatter point in one set is symmetrically located about a common centerpoint relative to a scatterpoint in the other set. For illustrative purposes two scatter points $A_1$ and $A_2$ are shown (greatly enlarged), with $A_1$ being a scatter point selected at random from one set and $A_2$ being the corresponding scatter point from the other set. In operation, light from the point source 11 passes through the focusing lens 12 and strikes the beamsplitter 13. Light reflected by the beamsplitter 13 passes through the scatterplate 14 and strikes the mirror M. Light reflected by the mirror M passes back through the scatterplate 14 and strikes the beamsplitter 13. Light transmitted through the beamsplitter 13 is either viewed visually at 18 or recorded.

An understanding of how the two bundles of scattered light are produced and caused to interfere can be more easily seen by tracing the path taken by a single ray $R_1$ which is emitted by the source 11 and which strikes the scatterplate 14 at the scatter point $A_1$. Most of the light from ray $R_1$ transmitted through the scatterplate 14 is specular. In the diagram this light is shown as a solid line B. However, part of the light from ray $R_1$ on passing through the scatterplate interacts with the scatter point $A_1$. This point thus becomes a secondary point source of light emitting a beam of scattered light having a truly spherical wavefront. In the diagram the bundle of scattered light is shown in broken lines C. The beam of scattered light C impinges on the spherical mirror M and after reflection has impressed on it any errors in the contour of the reflecting surface of the spherical mirror M. Having originated in the plane of the radius of curvature of the mirror M, the reflected beam of scattered light C will come to focus again in this plane, that is, on the scatterplate 14, and specifically at scatter point $A_2$ which is symmetrically positioned relative to scatter point $A_1$, about a centerpoint O. Reflected light bundle C is largely specularly transmitted by the scatterplate 14. In the drawing it is shown in dotted lines $C_1$. The portion of light C scattered by $A_2$ is negligibly low and is not shown. Referring back again to ray $R_1$, the specularly transmitted light B from the scatterplate 14 impinges on and is reflected by the spherical mirror M but insofar as it is reflected by a very small surface area of the mirror M does not carry any imprint of the surface. The reflected specularly transmitted light B impinges on the scatterplate 14 at scatter point $A_2$. The greater portion of this light B is specularly transmitted through the scatterplate 14, however, a portion of the light interacts with scatter point $A_2$ producing a beam of scattered light $B_1$ shown with solid lines, having a truely spherical wavefront. In the drawing the specularly transmitted light is not shown. These two spherical wavefronts, i.e., $B_1$ and $C_1$, are superimposed on each other and interfere. In the drawing, for illustrative purposes, beam $B_1$ is shown slightly displaced from beam $C_1$. The light specularly transmitted through the scatterplate at scatter point $A_2$ from light B appears as a bright spot in the field of interference fringes.

Thus, as can be seen, two spherical wavefronts are created, one caused by scatter point $A_1$ which is distorted by any surface errors in the mirror M and one by scatter point $A_2$ which is distortion free.

The details of the scatterplate are shown in FIGURES 2 and 3. The scatterplate 14 comprises a substrate 21 of transparent material such as glass. One side of the substrate 21 has a layer of translucent material L. This layer is of non-uniform thickness. The peaks or high points in the layer define two identical sets of scatter points. The two sets of scatter points are equal in number and are positioned on the substrate 21 so that each point in one set has a counterpart (a corresponding point) symmetrically disposed about a center or reference point O. For illustrative purposes nine scatter points are enlarged and shown from each set. Scatter points 22 through 31 are shown as solid lined circles and are the scatter points from one set. Scatter points 32 through 41 are shown as broken lined circles and are the scatter points from the other set. The counterparts of scatter points 22 through 31 are scatter points 32 through 41, respectively. As can be seen, scatter points 22 and 32 are symmetrical about centerpoint O etc. The scatterplate 14 further includes a fiduciary mark 42 for indicating the location of the center of symmetry O of the two sets of scatter points. The fiduciary mark 42 is essentially two elongated narrow areas 43 and 44 on the plate 21 which are not covered with translucent material L and which intersect at the center of symmetry O. The scatterplate 14 further includes an antireflection coating 45 on the rear surface of the substrate 21 and an antireflection coating 46 on the front surface of the substrate 21. Antireflection coatings 45 and 46 may be identical coatings. In FIGURE 3 the thickness of the antireflection coatings and layer L are shown greatly enlarged for illustrative purposes.

The fiduciary mark 42 is required for the exact superposition of the image of the scatterplate 14 returned by the element under test on the scatterplate 14, for only then will interference fringes be formed.

The provision of an antireflection coating on both surfaces of the scatterplate is an extremely important feature of the invention insofar as it reduces the back reflection of the illuminating source from both surfaces. If not appreciably eliminated the back reflections can considerably reduce the contrast of the fringe system. A back scatter of about 4% is about the same magnitude as the light reflected from an unsilvered or unaluminized glass surface and will effectively wash out the interference fringe system that might otherwise be formed. By providing an efficient anti-reflection coating on both surfaces of the scatterplate, the back reflection and back scatter is reduced to less than 1%. Thus, it is possible to use this type of interferometry to inspect a test piece while it is being worked and without having to make the surface of the test piece highly reflective by aluminizing or silvering it.

Referring now to FIGURE 4, there is shown a schematic view of some of the apparatus used in making scatterplates according to this invention. For illustrative purposes the apparatus is arranged for making a scatterplate, sized to test an $f/1$ system.

Figure 5:
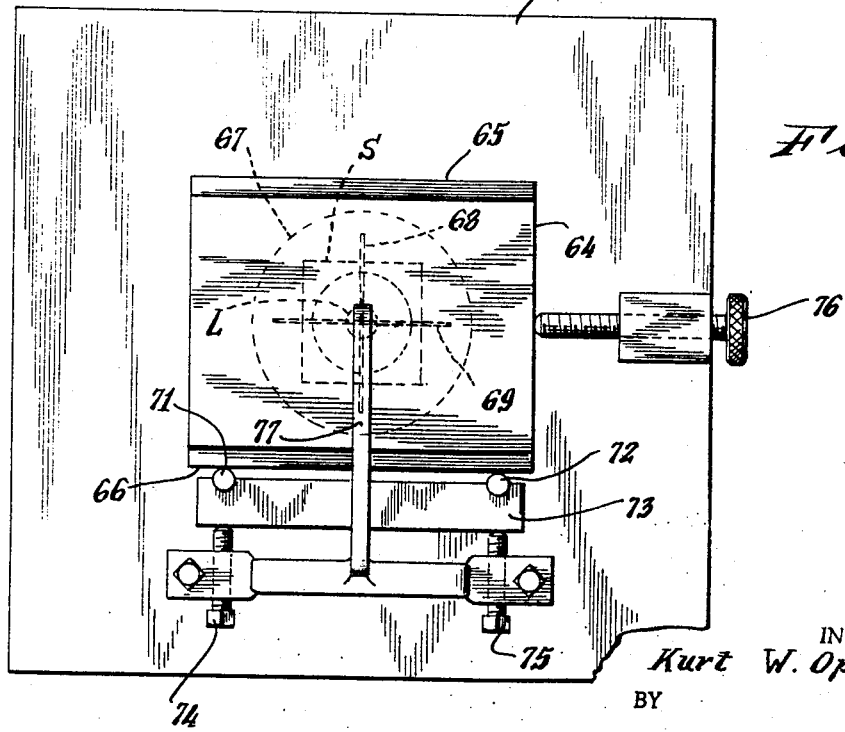
FIGURE 5 is an end view of the apparatus shown in FIGURE 4.

The apparatus includes a helium-neon 6328 A. laser light source 51, a beam expander 52, a 4 m./m. $f$:1 microscope objective 53, a plate having a pin hole 54, a condensing lens system made up of lenses 55, 56, 57, 58, a neutral density correction filter 59, a ground glass diffuser plate 61, and a scatterplate holder assembly 62. The light beam from the laser 51 passes through the beam expander 52 where it is enlarged in diameter so as to fill the microscope objective 53. Light emerging from microscope objective 53 is brought to focus at the pin hole 54 which is located at the focus of the condensing lens system. The purpose of the condensing lens system is to produce an approximately f/1 cone of light. The neutral density correction filter 59 which is positioned between lens elements 57 and 58 has a gaussian radial density distribution to correct for the gaussian energy distribution of the laser 51 and insure a uniform exposure of the scatterplate being made. This type of filter is well known in the art. Light emerging from the condensing lens system passes through the ground glass diffusser plate 61 where it is broken up into specularly transmitted and scattered light. The diffusser plate 61 is of a fine texture and typical of the ground glass used as the focusing screen in cameras. The scatterplate holder assembly 62 which is also shown in FIGURE 5 includes a supporting frame 63 and a scatterplate holder 64. The scatterplate holder 64 is in the form of a metal plate in which the top and bottom edges 65 and 66 are made parallel to an accuracy of 1 to 2 arc seconds so that the scatterplate can be rotated precisely 180° between exposures. The supporting frame 63 has an aperture 67 across which is stretched a pair of fine 0.002 inch diameter tungsten wires 68 and 69. Light blocked by the wires 68 and 69 results in the formation of a fiduciary mark located at and indicating the center of symmetry. The scatterplate S is mounted on and secured to the scatterplate holder 64 by any convenient means such as adhesive tape (not shown). The scatterplate holder 64 is mounted on two cylindrical rods 71 and 72 which are seated in grooves on an elongated bar 73. The plateholder 64 can be adjusted vertically by means of screws 74 and 75 so that the horizontal wire 69 can be centered and made parallel to the top and bottom edges 65 and 66 of the plateholder. An adjustable screw 76 is also provided for centering the vertical wire 68 on the plateholder. The scatterplate S is held against the supporting frame 63 by a lever 77 which presses against the scatterplate holder 64. As can be seen the wires 68 and 69 are spaced inward from the rear surface of the supporting frame 63 approximately a few thousandths of an inch and are not in contact with the scatterplate S. If the scatterplate S is exactly centered on the scatterplate holder 64 a fiduciary mark in the form of a single set of crosslines will be formed. If not two sets of crosslines will be formed of which the center indicates the center of symmetry. The distance between the diffusser plate 61 and the scatterplate S is not critical and may be for example approximately one and one fourth inches.

The following is a description of the method actually used in successfully making a scatterplate according to this invention.

First, a high resolution photographic plate (unexposed) was cut to a size of 1 inch by 1½ inches. The plate used was a 4 inch by 5 inch Eastman Kodak 649 F emulsion plate having a thickness of about 0.040 inch. The cut plate was secured to the scatterplate holder and mounted on the supporting frame with the emulsion side facing in the direction of the diffusser screen. A helium-neon 6328 A. laser was energized, exposing the emulsion on the plate to the light transmitted through the diffusser screen for approximately 17 seconds. The scatterplate was then rotated 180° in its plane and exposed again for approximately 17 seconds. The doubly exposed plate was then immersed in a developing solution of Ethol/tec for about 15 minutes at a temperature of about 65° F. The developed plate was then placed in a fixing solution of Eastman Kodak Rapid Fixer with Acid Hardener to insure that no unexposed silver remained in the emulsion. The plate was then washed in running water for about 30 minutes and placed in a bleaching bath of ½% solution of potassium ferricyanide in distilled water for about 10 minutes, during which time the silver image was converted to a bleached image. The plate was then washed and slowly dried. Once dry, the plate was coated on both sides with an antireflection coating.

It has been found that to obtain optimum interference fringe contrast, the exposure time should be controlled so that after the double exposure and before the bleaching the silver image has a density of about 1. After bleaching the specularly transmitted light will be about 80% and the scattered light about 20%. Using a helium-neon 6328 A. laser it was found that the optimum time for exposures was between 15 and 20 seconds. Exposure times below 15 seconds produced weak scatterplates and exposure times over 20 seconds showed no improvement in fringe contrast but only an increase in density.

Obviously, many modifications and variations of the present invention are possible in the light of the above teachings.

What is claimed is:
1. A scatterplate comprising:
 (a) a plate of light transparent material;
 (b) a nonuniform layer of translucent material formed on at least a portion of one side of the plate, the nonuniform layer of translucent material having a plurality of areas of maximum thickness defining peaks, the peaks constituting two sets of light scattering elements being located about a common point such that each light scattering element from one set is symmetrical relative to a light scattering element from the other set; and
 (c) an antireflection coating coating formed on both sides of the plate.
2. The invention according to claim 1, and further including a fiduciary mark indicating the location of the common point.
3. The invention according to claim 2, and wherein the fiduciary mark passes through the common point.
4. The invention according to claim 3, and wherein the fiduciary mark comprises a portion of the side of the plate containing the translucent material that is substantially not covered with the translucent material.
5. The invention according to claim 1, and wherein the translucent material comprises a silver compound.
6. The invention according to claim 5, and wherein the silver compound is silver ferrocyanide.
7. In a scatterplate having two sets of scatter points located on a transparent plate and arranged about a common reference point such that each scatter point from one set is symmetrical relative to a scatter point from the other set, the improvement comprising an antireflection coating deposited on both sides of the plate.
8. The invention according to claim 7, and wherein the improvement further includes a fiduciary mark in the vicinity of the common reference point for indicating its location.

No references cited

DAVID SCHONBERG, Primary Examiner

T. H. KOSMER, Assistant Examiner

U.S. Cl. X.R.
96—27; 117—33.3; 350—163.19; 356—109